(12) United States Patent
Kato

(10) Patent No.: US 9,548,816 B2
(45) Date of Patent: Jan. 17, 2017

(54) WAVELENGTH CONTROL OF TWO-CHANNEL DEMUX/MUX IN SILICON PHOTONICS

(71) Applicant: INPHI CORPORATION, Santa Clara, CA (US)

(72) Inventor: Masaki Kato, Palo Alto, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/076,414

(22) Filed: Mar. 21, 2016

(65) Prior Publication Data
US 2016/0204891 A1 Jul. 14, 2016

Related U.S. Application Data

(63) Continuation of application No. 14/536,294, filed on Nov. 7, 2014, now Pat. No. 9,325,419.

(51) Int. Cl.
*H04B 10/00* (2013.01)
*H04B 10/40* (2013.01)
(Continued)

(52) U.S. Cl.
CPC ............ *H04B 10/40* (2013.01); *H04B 10/506* (2013.01); *H04B 10/676* (2013.01); *H04J 14/02* (2013.01); *H04B 10/43* (2013.01)

(58) Field of Classification Search
CPC ..... H04B 10/40; H04B 10/43; H04B 10/5053; H04B 10/5059; H04B 10/506; H04B 10/676; H04J 14/02; H04J 14/002; H04J 14/0205; H04J 14/0209; H04J 14/0216; H04J 14/0217
(Continued)

(56) References Cited

U.S. PATENT DOCUMENTS 5,592,612 A 1/1997 Birk
6,128,094 A 10/2000 Smith
(Continued)

OTHER PUBLICATIONS

Office Action for U.S. Appl. No. 13/653,373, dated Mar. 27, 2014.
(Continued)

*Primary Examiner* — M. R. Sedighian
(74) *Attorney, Agent, or Firm* — Richard T. Ogawa; Ogawa P.C.

(57) ABSTRACT

Method and devices of controlling wavelengths in two-channel DEMUX/MUX in silicon photonics are provided. The two-channel DEMUX/MUX includes a waveguide-based delay-line-interferometer at least in receiver portion of a two-channel transceiver for DWDM optical transmission loop and is configured to split a light wave with combined two-wavelengths into one light wave with locked one channel wavelength and another light wave with locked another channel wavelength. The waveguide-based delayed-line interferometer (DLI) is characterized by a free-spectral-range configured to be equal to twice of channel spacing. The method includes tuning heater of DLI in receiver of each two-channel transceiver by using either low-frequency dither signals added on MZMs associated with respective two channels as feedback signal or one DFB laser wavelength tapped from an input of transmitter portion at one channel before or after the MZMs as a direct wavelength reference to feed into an output of receiver portion at another channel.

20 Claims, 5 Drawing Sheets

(51) Int. Cl.
*H04J 14/02* (2006.01)
*H04B 10/50* (2013.01)
*H04B 10/67* (2013.01)
*H04B 10/43* (2013.01)

(58) Field of Classification Search
USPC .......................................................... 398/135
See application file for complete search history.

(56) References Cited

U.S. PATENT DOCUMENTS

| | | | |
|---|---|---|---|
| 6,400,621 | B2 | 6/2002 | Hidaka et al. |
| 6,542,956 | B1 | 4/2003 | Lee et al. |
| 6,993,701 | B2 | 1/2006 | Corbett et al. |
| 7,656,727 | B2 | 2/2010 | Thayer |
| 7,990,746 | B2 | 8/2011 | Rajan |
| 8,126,337 | B2 * | 2/2012 | Malouin ............... H04B 10/548 359/279 |
| 8,300,994 | B2 * | 10/2012 | Welch .................... B82Y 20/00 385/14 |
| 8,325,554 | B2 | 12/2012 | Sweere et al. |
| 8,483,574 | B2 * | 7/2013 | Zhang ................ H04B 10/5561 398/158 |
| 8,687,451 | B2 | 4/2014 | Wang |
| 9,166,721 | B2 * | 10/2015 | Willner ................ H04J 14/002 |
| 9,225,422 | B1 * | 12/2015 | Nagarajan .......... H04B 10/2575 |
| 9,325,419 | B1 * | 4/2016 | Kato ....................... H04B 10/40 |
| 2004/0123029 | A1 | 6/2004 | Dalal et al. |
| 2006/0200697 | A1 | 9/2006 | Ito |
| 2008/0104290 | A1 | 5/2008 | Cowell et al. |
| 2008/0183959 | A1 | 7/2008 | Pelley et al. |
| 2009/0141558 | A1 | 6/2009 | Sarin et al. |
| 2009/0300259 | A1 | 12/2009 | Luo et al. |
| 2010/0005212 | A1 | 1/2010 | Gower et al. |
| 2010/0162037 | A1 | 6/2010 | Maule et al. |
| 2010/0199125 | A1 | 8/2010 | Reche |
| 2010/0274952 | A1 | 10/2010 | Lee |
| 2011/0072200 | A1 | 3/2011 | Lee et al. |
| 2011/0125990 | A1 | 5/2011 | Khosravi et al. |
| 2011/0170329 | A1 | 7/2011 | Kang |
| 2012/0121264 | A1 * | 5/2012 | Chung ............... H04B 10/5053 398/65 |
| 2012/0151294 | A1 | 6/2012 | Yoo et al. |
| 2012/0243299 | A1 | 9/2012 | Shau |
| 2012/0257459 | A1 | 10/2012 | Berke |
| 2012/0297231 | A1 | 11/2012 | Qawami et al. |
| 2013/0060996 | A1 | 3/2013 | Berke |

OTHER PUBLICATIONS

Notice of Allowance for U.S. Appl. No. 13/558,332, dated Feb. 25, 2014.
Office Action for U.S. Appl. No. 13/620,288, dated Oct. 1, 2013.
Office Action for U.S. Appl. No. 13/791,814, dated May 1, 2014.
Office Action for U.S. Appl. No. 13/619,692, dated May 14, 2014.
Office Action for U.S. Appl. No. 13/620,288, dated May 16, 2014.
Office Action for U.S. Appl. No. 13/791,807, dated May 29, 2014.
Office Action for U.S. Appl. No. 14/178,241, dated Jun. 27, 2014.

* cited by examiner

WAVELENGTH CONTROL OF TWO-CHANNEL DEMUX/MUX IN SILICON PHOTONICS

CROSS-REFERENCES TO RELATED APPLICATIONS

The present application is a continuation of U.S. patent application Ser. No. 14/536,294 filed Nov. 7, 2014, the entire content of which is incorporated herein by reference.

BACKGROUND OF THE INVENTION

The present invention relates to optical telecommunication techniques. More particularly, the present invention provides DEMUX/MUX configurations of 2-channel silicon photonic devices for wavelength control and methods thereof.

Over the last few decades, the use of communication networks exploded. In the early days of Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Progress in computer technology (and the continuation of Moore's Law) is becoming increasingly dependent on faster data transfer between and within microchips. Optical interconnects may provide a way forward, and silicon photonics may prove particularly useful, once integrated on the standard silicon chips. 40-Gbit/s and then 100-Gbit/s data rates WDM optical transmission over existing single-mode fiber is a target for the next generation of fiber-optic communication networks. The big hangup so far has been the fiber impairments like chromatic dispersion that are slowing the communication signal down. Everything is okay up to 10 Gbits/s plus a little, but beyond that, distortion and attenuation take their toll. Many approaches are proposed on modulation methods for transmitting two or more bits per symbol so that higher communication rates can be achieved. Mach-Zehnder modulators (MZM) can handle the higher data rates but require a driver that is differential with a wide output voltage swing. Beyond the light modulation for data transmission, the MUX/DEMUX of light signals is an essential building block for the optical network based on silicon photonics.

Silicon photonic devices can be made using existing semiconductor fabrication techniques, and because silicon is already used as the substrate for most integrated circuits, it is possible to create hybrid devices in which the optical and electronic components are integrated onto a single microchip. In particular, silicon photonic devices have been applied in dense-wavelength-division multiplexing (DWDM) optical transmission networks, in which DEMUX/MUX of light signals require precise wavelength targeting and control over environment temperature change. Therefore, improved wavelength control techniques and methods are desired.

BRIEF SUMMARY OF THE INVENTION

The present invention relates to optical telecommunication techniques. More particularly, the present invention provides a two-channel DUMUX/MUX device for waveguide-based wavelength control in silicon photonics. Merely by examples, the present invention discloses several DEMUX/MUX configurations of 2-channel silicon photonic devices for optical transmission and reception with wavelength control function integrated in a single waveguide chip for high data rate WDM optical communications, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a two-channel silicon photonic transceiver with wavelength control for DEMUX/MUX in DWDM applications. The two-channel silicon photonic transceiver includes a transmitter comprising a first optical input port and a second optical input port. The transmitter further includes a first modulator and a second modulator respectively coupled to the first optical input port and the second optical input port for modulating a first optical signal at a first wavelength and a second optical signal at a second wavelength. Additionally, the transmitter includes a 2×1 WDM combiner coupled to the first modulator and the second modulator to transmit a first transmission signal combined with the first wavelength and the second wavelength to a first optical output port. Additionally, the two-channel transceiver includes a receiver comprising a third optical input port, a second optical output port, a third optical output port, and a two-channel delay-line interferometer coupled between the third optical input port and second and third optical output ports. The third optical input port is configured to receive a second transmission signal combined with the first wavelength and the second wavelength. The second transmission signal is substantially similar to the first transmission signal. The delayed-line interferometer in the receiver is configured to split the second transmission signal to a third optical signal locked at the first wavelength to the second optical output port substantially free of element of the second wavelength and a fourth optical signal locked at the second wavelength to the third optical output port substantially free of element of the first wavelength.

In an alternative embodiment, the present invention provides a method of locking channel wavelengths through two-channel DEMUX/MUX in DWDM applications. The method includes disposing a first two-channel transceiver at a first terminal of a DWDM communication loop and a second two-channel transceiver at a second terminal of the DWDM communication loop. Each of the first and the second two-channel transceiver includes a transmitter having a first/second optical input port coupled with a first/second modulator and a 2×1 WDM combiner coupled to a first optical output port and a receiver comprising a third optical input port connected to a two-channel delay-line interferometer including a heater with a second/third optical output port. The method further includes coupling a first/second DFB laser light wave to the first/second optical input port of the transmitter of the first two-channel transceiver.

Additionally, the method includes modulating the first/second DFB laser light wave with a first/second wavelength at the first/second modulator to generate a first/second optical signal characterized by the first/second wavelength and combining the first optical signal with the second optical signal to a first transmission signal outputted through the first optical output port to a first optical fiber. The method further includes inserting a first/second dither signal to the first/second modulator. The first/second dither signal is carried by the first transmission signal. Furthermore, the method includes receiving the first transmission signal including the first/second dither signal from the first optical fiber by the third optical input port of the receiver of the second two-channel transceiver. The method further includes setting the two-channel delay-line interferometer in the receiver with a free-spectral range equal to twice of channel spacing between the first wavelength and the second wavelength for splitting the first transmission signal into a third optical signal including the first dither signal into the second optical output port and a fourth optical signal including the second dither signal into the third optical output port. Moreover, the method includes detecting the first/second ditcher signal at the second/third output port of the receiver of the second two-channel transceiver by a photodiode to obtain a first/second electrical signal and tuning the heater of the two-channel delay-line interferometer via a feedback circuit for maximizing the first/second electrical signal, thereby controlling the third/fourth optical signal at the second/third optical output port to be substantially free from element of the second/first wavelength.

In yet another alternative embodiment, the present invention provides a method of locking channel wavelengths through two-channel DEMUX/MUX in DWDM applications. The method includes disposing a first two-channel transceiver at a first terminal of a DWDM communication loop and a second two-channel transceiver at a second terminal of the DWDM communication loop. Each of the first and the second two-channel transceiver includes a transmitter having a first/second optical input port coupled with a first/second modulator and a 2×1 WDM combiner coupled to a first optical output port and a receiver comprising a third optical input port connected to a two-channel delay-line interferometer including a heater with a second/third optical output port. The method further includes coupling a first/second DFB laser light wave to the first/second optical input port of the transmitter of the first two-channel transceiver and tapping 2-10% power of the second/first DFB laser light wave then fed to the second/third optical output port of the receiver of the first two-channel transceiver as a reference signal. Additionally, the method includes modulating the first/second DFB laser light wave with a first/second wavelength at the first/second modulator to generate a first/second optical signal characterized by the first/second wavelength and combining the first optical signal with the second optical signal to a first transmission signal outputted through the first optical output port to a first optical fiber. The method further includes receiving the first transmission signal by the second two-channel transceiver and sending a second transmission signal to a second optical fiber, the second transmission signal being characterized by the first wavelength and the second wavelength. The method also includes receiving the second transmission signal from the second optical fiber by the receiver of the first two-channel transceiver and setting the two-channel delay-line interferometer in the receiver with a free-spectral range equal to twice of channel spacing between the first wavelength and the second wavelength for splitting the second transmission signal into a third optical signal into the second optical output port and a fourth optical signal into the third optical output port. Furthermore, the method includes detecting the reference signal by a photodiode next to the third optical input port of the receiver of the first two-channel transceiver to obtain an electrical signal. Moreover, the method includes tuning the heater of the two-channel delay-line interferometer via a feedback circuit for maximizing the electrical signal, thereby controlling the third/fourth optical signal at the second/third optical output port to be substantially free from element of the second/first wavelength.

In still another alternative embodiment, the present invention provides a method of locking channel wavelengths through two-channel DEMUX/MUX in DWDM applications. The method includes disposing a first two-channel transceiver at a first terminal of a DWDM communication loop and a second two-channel transceiver at a second terminal of the DWDM communication loop. Each of the first and the second two-channel transceiver includes a transmitter having a first/second optical input port coupled with a first/second modulator and a 2×1 WDM combiner coupled to a first optical output port and a receiver comprising a third optical input port connected to a two-channel delay-line interferometer including a heater with a second/third optical output port. The method further includes coupling a first/second DFB laser light wave to the first/second optical input port of the transmitter of the first two-channel transceiver. Additionally, the method includes modulating the first/second DFB laser light wave with a first/second wavelength at the first/second modulator to generate a first/second optical signal characterized by the first/second wavelength and tapping 2-10% power of the second/first optical signal after the second/first modulator, then feeding the power to the second/third optical output port of the receiver of the first two-channel transceiver as a reference signal. The method further includes combining the first optical signal with the second optical signal to a first transmission signal outputted through the first optical output port to a first optical fiber. Furthermore, the method includes receiving the first transmission signal by the second two-channel transceiver and sending a second transmission signal to a second optical fiber, the second transmission signal being characterized by the first wavelength and the second wavelength. The method also includes receiving the second transmission signal from the second optical fiber by the receiver of the first two-channel transceiver and setting the two-channel delay-line interferometer in the receiver with a free-spectral range equal to twice of channel spacing between the first wavelength and the second wavelength for splitting the second transmission signal into a third optical signal into the second optical output port and a fourth optical signal into the third optical output port. The method further includes detecting the reference signal by a photodiode next to the third optical input port of the receiver of the first two-channel transceiver to obtain an electrical signal. Moreover, the method includes tuning the heater of the two-channel delay-line interferometer via a feedback circuit for maximizing the electrical signal, thereby controlling the third/fourth optical signal at the second/third optical output port to be substantially free from element of the second/first wavelength.

The present invention achieves these benefits and others in the context of known waveguide laser communication technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1A:
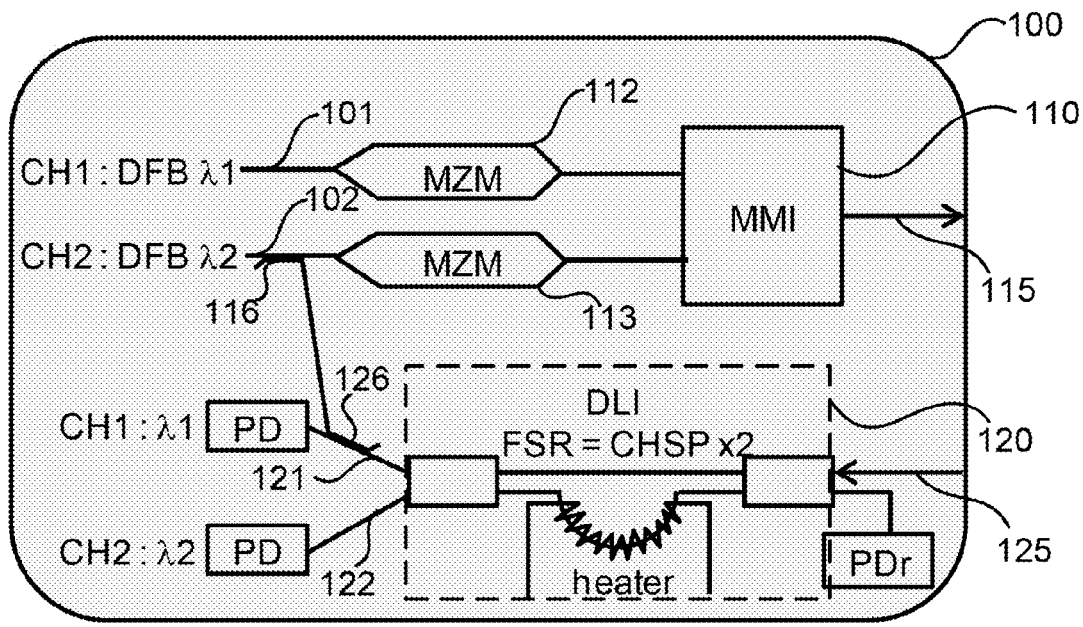
FIG. 1A is a simplified diagram of a two-channel transceiver including a 3 dB combiner as MUX and a waveguide-based delay-line-interferometer as DEMUX according to an embodiment of the present invention.

The present invention relates to optical telecommunication techniques. More particularly, the present invention provides a two-channel DUMUX/MUX device for waveguide-based wavelength control in silicon photonics. Merely by examples, the present invention discloses several DEMUX/MUX configurations of 2-channel silicon photonic devices for optical transmission and reception with wavelength control function integrated in a single waveguide chip for high data rate WDM optical communications, though other applications are possible.

In the last decades, with advent of cloud computing and data center, the needs for network servers have evolved. For example, the three-level configuration that have been used for a long time is no longer adequate or suitable, as distributed applications require flatter network architectures, where server virtualization that allows servers to operate in parallel. For example, multiple servers can be used together to perform a requested task. For multiple servers to work in parallel, it is often imperative for them to be share large amount of information among themselves quickly, as opposed to having data going back forth through multiple layers of network architecture (e.g., network switches, etc.).

Leaf-spine type of network architecture is provided to better allow servers to work in parallel and move data quickly among servers, offering high bandwidth and low latencies. Typically, a leaf-spine network architecture uses a top-of-rack switch that can directly access into server nodes and links back to a set of non-blocking spine switches that have enough bandwidth to allow for clusters of servers to be linked to one another and share large amount of data.

In a typical leaf-spine network today, gigabits of data are shared among servers. In certain network architectures, network servers on the same level have certain peer links for data sharing. Unfortunately, the bandwidth for this type of set up is often inadequate. It is to be appreciated that embodiments of the present invention utilizes PAM (e.g., PAM4, PAM8, PAM12, PAM16, etc.) in leaf-spine architecture that allows large amount (up terabytes of data at the spine level) of data to be transferred via optical network.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1A is a simplified diagram of a two-channel transceiver including a 3 dB combiner as MUX and a waveguide-based delay-line-interferometer as DEMUX according to an embodiment of the present invention. This diagram is merely an example, which should not unduly limit the scope of the claims. One of ordinary skill in the art would recognize many variations, alternatives, and modifications. As shown, the two-channel WDM transceiver 100 includes a two-channel transmitter having two optical inputs, 101 and 102, each receiving a laser light from a corresponding DFB laser source with a predetermined wavelength, λ1 or λ2. Each laser light is modulated by a MZM modulator, 112 or 113, to generate an optical signal bearing the corresponding wavelength, λ1 or λ2. The two-channel transmitter further includes a 3 dB power combiner 110 as a MUX device to combine the two optical signals into one optical output 115. The MUX 110 can be either a MMI combiner or DC combiner.

Additionally, the two-channel WDM transceiver 100 includes a two-channel receiver having an optical input 125 configured to receive one or more wavelength signals into a waveguide-based delay-line-interferometer (DLI) 120. For example, a two-wavelength (λ1 and λ2) combined signal is received at the optical input 125 of an 1×2 splitter before entering the DLI 120. The DLI 120 is configured to have one path chosen to be longer than another path by a specific length so that its free spectral range is equal to twice of channel spacing of the two wavelengths (λ1 and λ2). The longer path also includes a resistive heater for wavelength control adjustment. Therefore, the DLI 120 acts as a deinterleaver or a DEMUX device which is able to split the signal from the input 125 with combined two wavelengths into two signals respectively output to two optical outputs, 121 and 122, each carrying a signal with a single wavelength. For example, output 121 carries λ1 at channel 1 (CH1) and output 122 carries λ2 at channel 2 (CH2), each being independently detected by a photodiode.

In an embodiment, a photodiode can also be coupled next to the optical input 125 of the DLI 120 for measuring any reflected signal. The DLI 120 in the receiver needs to be tuned so that light with wavelength λ1 goes to CH1 PD and light with wavelength λ2 goes to CH2 PD. This can be done by using the DFB laser light wavelength as a wavelength reference. In a specific embodiment, a small portion (typically 2~10%) of CH2 DFB (or CH1 DFB can be used alternatively) is tapped and fed into the receiver DLI 120 via a reverse CH1 path from output 121 (or CH2 path from output 122 can be used alternatively). Then the heater on the DLI 120 is tuned so the power at PD coupled next to the optical input 125 is maximized. In such a way, the DLI 120 is tuned to provide a free spectral range equal to the channel spacing between λ1 and λ2 so that the resulted interference spectral gives desired interleaving wavelengths respectively into CH1 output 121 and CH2 output 122. More description about the DLI tuning will be found in subsequent sections of the specification.

Figure 1B:
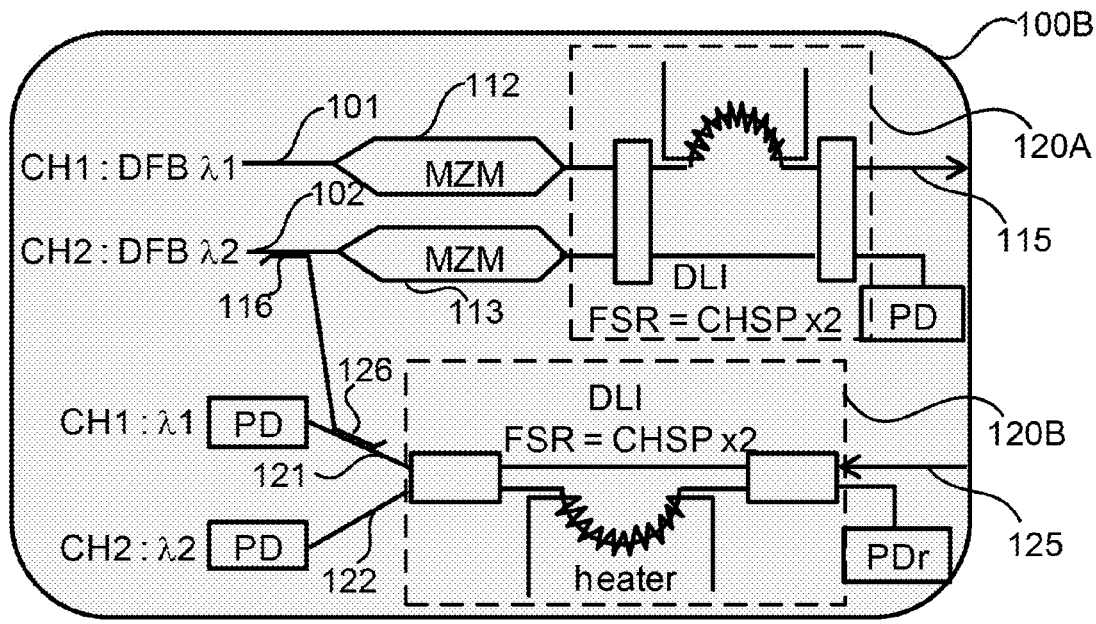
FIG. 1B is a simplified diagram of a two-channel transceiver including a waveguide-based delay-line-interferometer with free-spectral-range equal to twice of channel spacing as either DUMUX or MUX according to an embodiment of the present invention.

FIG. 1B is a simplified diagram of a two-channel transceiver including a waveguide-based delay-line-interferometer with free-spectral-range equal to twice of channel spacing as either DUMUX or MUX according to an embodiment of the present invention. This diagram is merely an example, which should not unduly limit the scope of the claims. One of ordinary skill in the art would recognize many variations, alternatives, and modifications. As shown, the two-channel WDM transceiver 100B is substantially the same as the two-channel WDM transceiver 100 except that the MMI combiner 110 in the transmitter is replaced by a waveguide-based DLI 120A while in the receiver a substantially the same waveguide-based DLI 120B is retained therein. Other configurations and wavelength control schemes are the same as those described above. Each of the two DLIs, 120A and 120B, contains a resistive heater configured for wavelength control by adjusting interference spectrum so that the free spectral range is equal to the channel spacing between λ1 and λ2.

Figure 2:
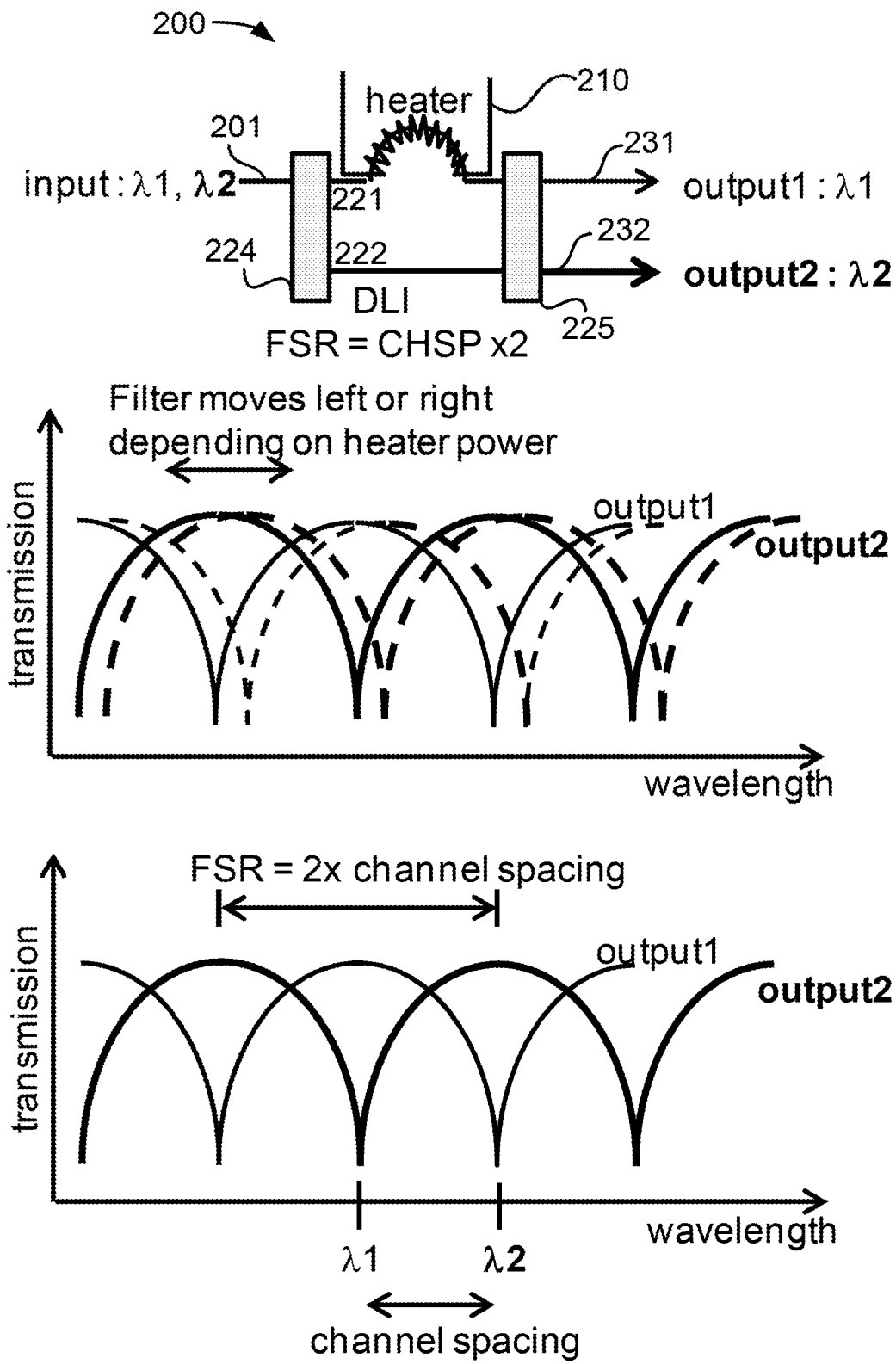
FIG. 2 is a simplified diagram of a two-channel waveguide-based delay-line-interferometer with free-spectral-range equal to twice of channel spacing according to an embodiment of the present invention.

FIG. 2 is a simplified diagram of a two-channel waveguide-based delay-line-interferometer with free-spectral-range equal to twice of channel spacing according to an embodiment of the present invention. This diagram is merely an example, which should not unduly limit the scope of the claims. One of ordinary skill in the art would recognize many variations, alternatives, and modifications. As shown, the two-channel waveguide-based delay-line-interferometer 200 includes at least one input 201 receiving a light wave with two wavelengths λ1 and λ2, a 1×2 power splitter 224 to split the light wave received from the input 201 to two paths 221 and 222, a 2×2 coupler 225 coupled between the two paths 221, 222 and two outputs 231, 232. The two paths 221 and 222 are silicon-based waveguide built on a single-chip SOI substrate. Particularly, one waveguide path, e.g., 221, is designed to be longer than another waveguide path 222 to give a delayed phase for path 221. Each path, either 221 or 222, still carries light signal with both wavelengths λ1 and λ2. When the two paths are merged at the 2×2 coupler 225 the light signal with delayed phase in path 221 and wavelength λ1 (or λ2) interferes with the light signal in path 222 with the same wavelength λ1 (or λ2) to generate two transmission interference spectrums separated due to wavelength difference between λ1 and λ2 as well as delayed phase caused by length difference between the two paths 221 and 222.

In a specific embodiment, the two-channel waveguide-based delay-line-interferometer (DLI) 200 includes a resistive heater 210 disposed to one, usually the longer one, path 221, to provide a tuning mechanism for the delayed phase by changing temperature to cause refractive index change through the corresponding waveguide. In an embodiment, for each output 231 or 232 the DLI 200 acts as a filter allowing a light wave with only one wavelength (either λ1 or λ2) to partially pass out. In addition to the extra length in path 221, the temperature change provided by the heater 210 is able to further add delayed phase for the path 221 relative to the path 222. As a result, the output transmission interference spectrum (ouput1) of the light wave with two wavelengths λ1 and λ2 at output 231 versus the output transmission interference spectrum (ouput2) at output 232 will move left or right along the wavelength axis depending on the heater power.

Each of the transmission interference spectrums produced by the DLI 200 is characterized by a plurality of passbands respectively distributed around λ1 (or λ2) at a first harmonic peak and periodically around a plurality of higher harmonic peaks. The peak-peak spacing is defined as a free-spectral-range (FSR). For the light wave with two wavelengths λ1 and λ2 in the present case, in a specific embodiment, FSR is tuned to be equal to twice of the difference between λ1 and λ2. In such a manner, the DLI 200 filter acts exactly as a deinterleaver that split the light wave with two wavelengths into two separate light waves each with one wavelength.

Figure 3:
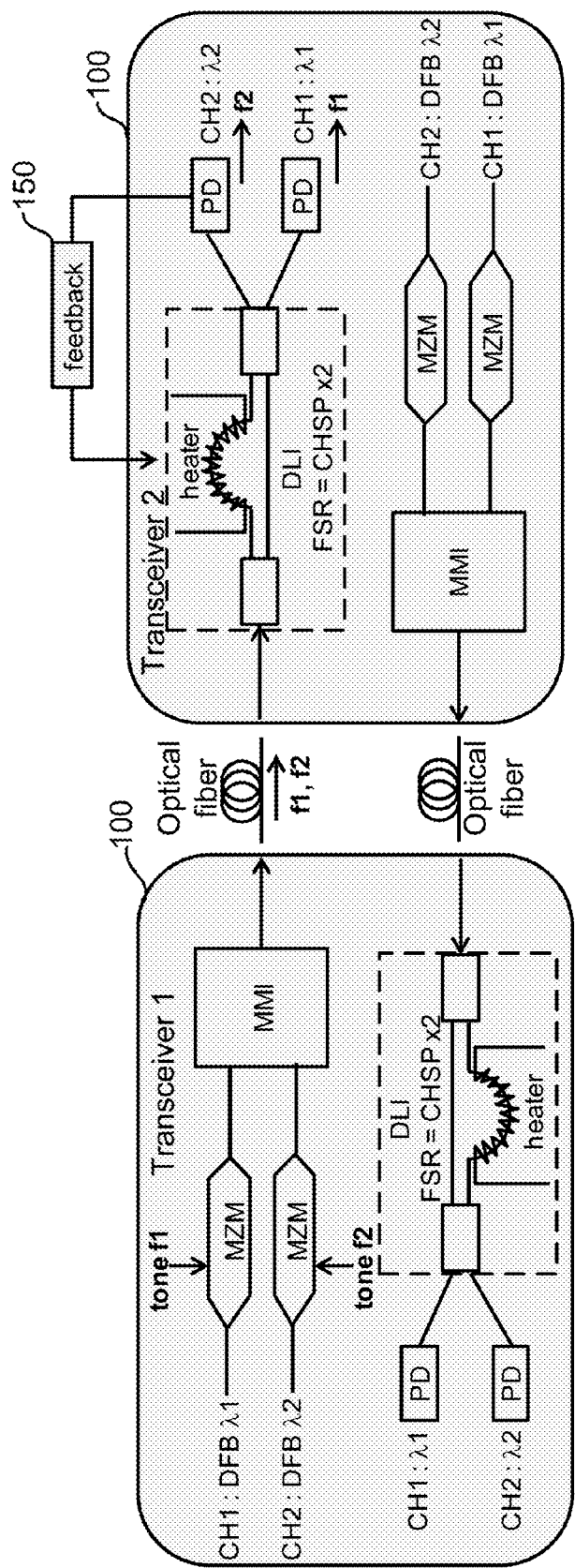
FIG. 3 is a simplified diagram of a pair of two-channel transceivers using tones for wavelength controlled transmission according to an embodiment of the present invention.

FIG. 3 is a simplified diagram of a pair of two-channel transceivers using tones for wavelength controlled transmission according to an embodiment of the present invention. This diagram is merely an example, which should not unduly limit the scope of the claims. One of ordinary skill in the art would recognize many variations, alternatives, and modifications. As shown, the pair of two-channel transceivers (Transceiver 1 and Transceiver 2) is respectively disposed at transmitting and receiving ends as MUX and DEMUX of a two-way traffic optical communication loop including wavelength control. For example in the transmission path of the optical communication loop, Transceiver 1 is configured to use two DFB laser sources with light wavelength at λ1 and λ2 being respectively modulated on two MZMs to form two optical signals before being combined into one output for transmitting through optical fiber. In an embodiment, the DFB laser wavelengths $\lambda 1$ and $\lambda 2$ are selected to be two neighboring channels of ITU grid with a channel spacing of 100 GHz, or 50 GHz, or 25 GHz, or others. The Transceiver 1 can be the two-channel transceiver 100 described in FIG. 1A. Alternatively, the Transceiver 1 can be the two-channel transceiver 100B with the waveguide-based DLI as a 2×1 combiner in FIG. 1B. Further, Transceiver 2 disposed at the receiving end includes the waveguide-based DLI as a 1×2 splitter (a deinterleaver) at least at the receiving portion.

In a specific embodiment, two low-frequency dither signals (tones) f1 and f2 are added on respective two MZMs for controlling quadrature transfer curve for modulating and locking the wavelength $\lambda 1$ or $\lambda 2$ of transmitted light wave in corresponding CH1 or CH2 output. The tones f1 and f2 are carried with the light wave signals through optical fiber and received by the Transceiver 2. The waveguide-based DLI in Transceiver 2 is tuned to have a FSR equal to twice of the wavelength difference $\lambda 1 - \lambda 2$ to split the light wave into two interleaved parts and deliver a first light wave with $\lambda 1$ and tone f1 to CH1 output and a second light wave with $\lambda 2$ and tone f2 to CH2 output. At the CH1 output a photodiode (PD) is used to detect (a taped portion of) the light wave signal with wavelength $\lambda 1$ as well as to detect the tone f1. Similarly, another PD is also used at CH2 to detect (a tapped portion of) both signal $\lambda 2$ and tone f2. Tone f1 (f2) as detected by the PD is converted to an electrical signal. The Transceiver 2 further includes a feedback circuit 150 coupled between the PDs and the heater of DLI in the receiver portion of Transceiver 2 and configured to use the converted electrical signal based on f1 (f2) tone as a control signal to tune interference spectrums of the light wave with two wavelengths passing through the DLI (see description for FIG. 2). As the result, the f1 (f2) component at the CH1 (CH2) output is tuned be maximized so that the corresponding transmitted light wave at CH1 (CH2) output can be locked to its pre-select wavelength $\lambda 1$ ($\lambda 2$), e.g., at a specific wavelength of ITU grid with least interference from the other wavelength $\lambda 2$ ($\lambda 1$). Alternatively, by maintaining a stable power ratio between two electrical signals detected by two PDs in CH1 and CH2, the figure of merit of the modulation and wavelength control of two-channel DEMUX/MUX can be obtained.

Figure 4:
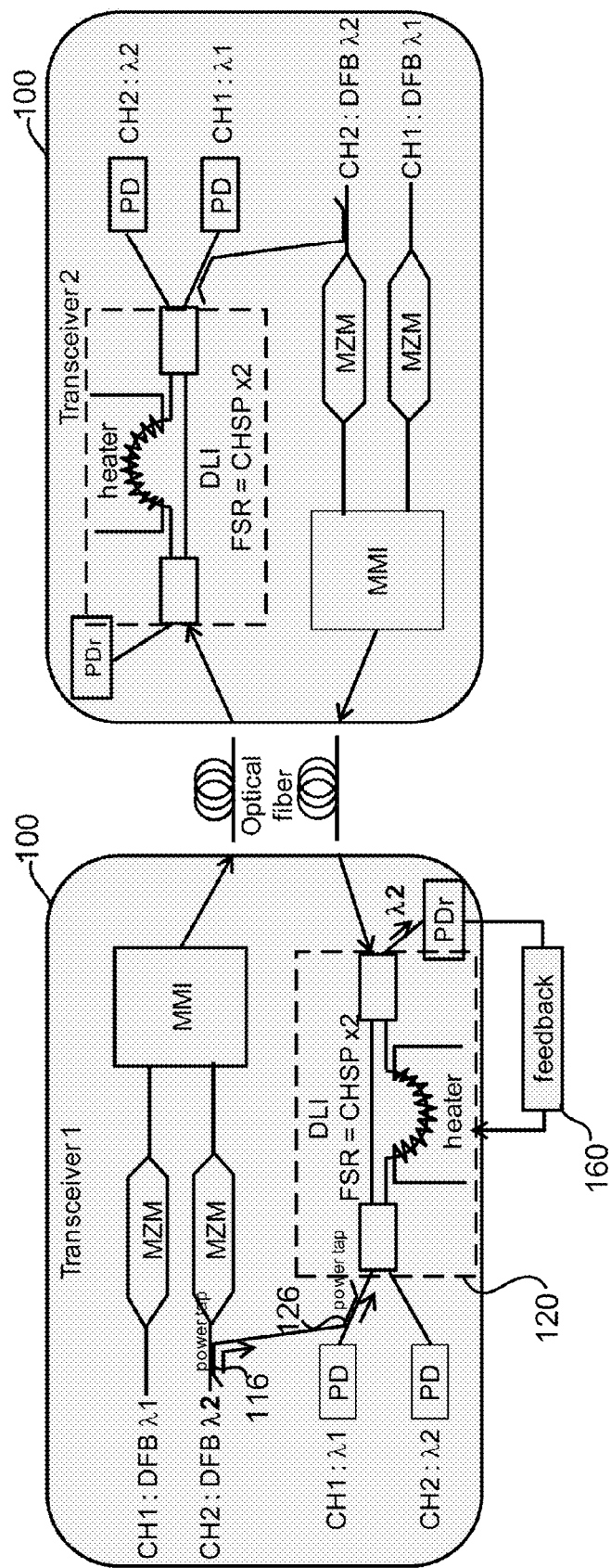
FIG. 4 is a simplified diagram of a pair of two-channel transceivers using tapped DFB signal for wavelength controlled transmission according to another embodiment of the present invention.

FIG. 4 is a simplified diagram of a pair of two-channel transceivers using tapped DFB signal for wavelength controlled transmission according to another embodiment of the present invention. This diagram is merely an example, which should not unduly limit the scope of the claims. One of ordinary skill in the art would recognize many variations, alternatives, and modifications. As shown, the pair of two-channel transceivers (Transceiver 1 and Transceiver 2) is respectively disposed at transmitting and receiving ends as MUX and DEMUX of a two-way traffic optical communication loop including wavelength control. In the transmission path of the optical communication loop, Transceiver 1 is configured to use two DFB laser sources with light wavelength at $\lambda 1$ and $\lambda 2$ being respectively modulated on two MZMs to form two optical signals before being combined into one output for transmitting through optical fiber. In an embodiment, the DFB laser wavelengths $\lambda 1$ and $\lambda 2$ are selected to be two neighboring channels of ITU grid with a channel spacing of 100 GHz, or 50 GHz, or 25 GHz, or others. The Transceiver 1 can be the two-channel transceiver 100 described in FIG. 1A. Alternatively, the Transceiver 1 can be the two-channel transceiver 100B with the waveguide-based DLI as a 2×1 combiner in FIG. 1B. Further, Transceiver 2 disposed at the receiving end includes the waveguide-based DLI as a 1×2 splitter (a deinterleaver) at least at the receiving portion.

The DLI in receiver portion of each Transceiver needs to be tuned so that $\lambda 1$ goes to CH1 PD and $\lambda 2$ goes to CH2 PD to maintain good wavelength control during optical signal transmission and receiving. In a specific embodiment, the wavelength control can be done by using the DFB laser wavelength (presumably been locked at certain ITU grid) as a wavelength reference. Particularly, the Transceiver 1 includes a first power tap device 116 coupled to, e.g., CH2 (or CH1) input that receives light wave with wavelength $\lambda 2$ (or $\lambda 1$), to draw a small portion (2-10%) of light wave $\lambda 2$ (or $\lambda 1$) component from CH2 DFB (or CH1 DFB) laser source. This $\lambda 2$ (or $\lambda 1$) component is fed (in a reverse direction) via a second power tap device 126 into CH1 (CH2) output path of the DLI 120 in the receiver portion of the Transceiver 1. After this tapped $\lambda 2$ (or $\lambda 1$) component passes through the DLI 120 and is detected by a photodiode (PDr) disposed next to the common input of the DLI 120, this $\lambda 2$ (or $\lambda 1$) component as a wavelength reference is converted to an electrical signal. The Transceiver 1 further includes a feedback circuit 160 to feed this electrical signal back to the heater of the same DLI 120 of the Transceiver 1 for tuning corresponding interference spectrums of the light wave (from return trip of the communication loop) with both wavelengths $\lambda 1$ and $\lambda 2$ so that the heater on the DLI 120 is tuned. In an embodiment, the heater power of the DLI 120 is tuned to have the $\lambda 2$ (or $\lambda 1$) power at PDr is maximized. As the result, the DLI 120 is set to make the light wave with locked $\lambda 1$ goes to CH1 PD and the light wave with locked $\lambda 2$ goes to CH2 PD as desired. Here the light waves belong to signals of the return trip of the communication loop.

In an alternative embodiment, the above wavelength control scheme using power tap from input DFB light component as wavelength reference can be also implemented to tune DLI in the Transceiver 2 in substantially similar fashion. As the result, the light wave in forward trip of the communication loop is also able to be well controlled to make the light wave with locked $\lambda 1$ goes to CH1 PD and the light wave with locked $\lambda 2$ goes to CH2 PD as desired.

Figure 5:
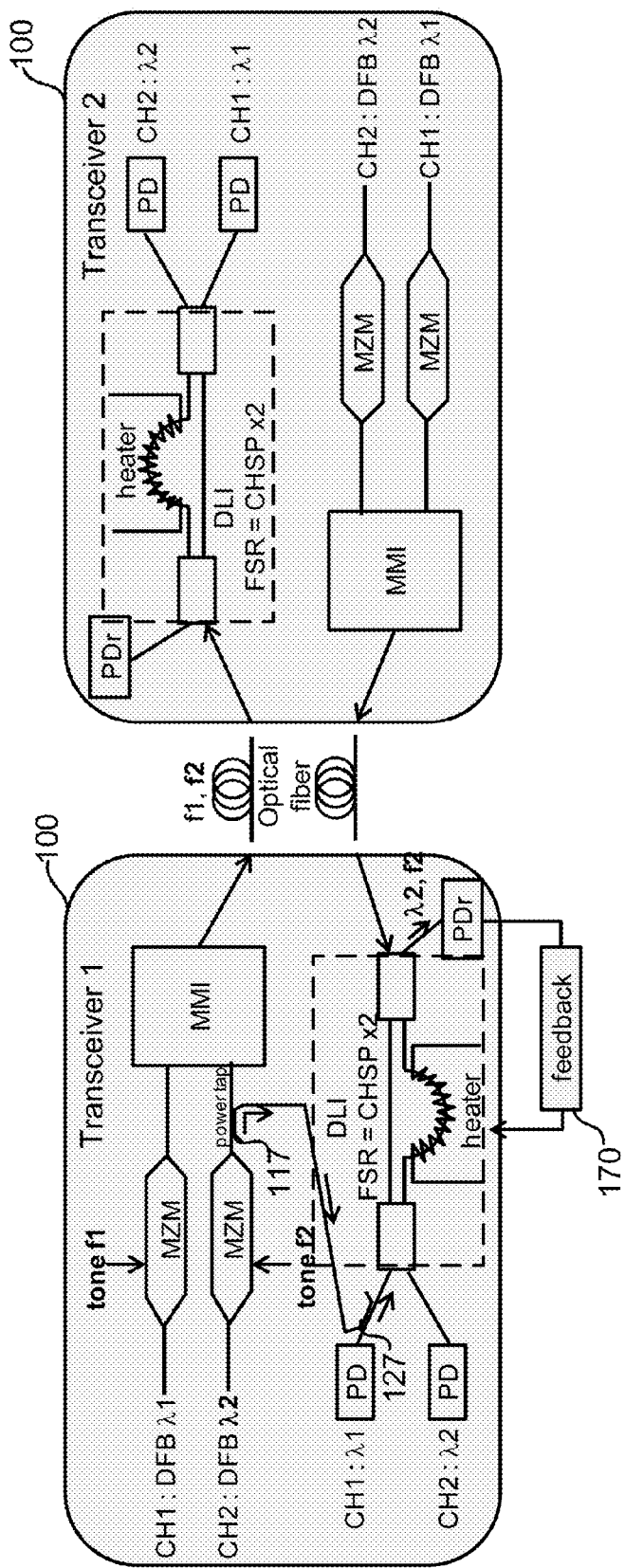
FIG. 5 is a simplified diagram of a pair of two-channel transceivers using tapped DFB signal after MZM including tones for wavelength controlled transmission according to yet another embodiment of the present invention.

FIG. 5 is a simplified diagram of a pair of two-channel transceivers using tapped DFB signal after MZM including tones for wavelength controlled transmission according to yet another embodiment of the present invention. This diagram is merely an example, which should not unduly limit the scope of the claims. One of ordinary skill in the art would recognize many variations, alternatives, and modifications. As shown, the pair of two-channel transceivers (Transceiver 1 and Transceiver 2) is respectively disposed at transmitting and receiving ends as MUX and DEMUX of a two-way traffic optical communication loop including wavelength control. In the transmission path of the optical communication loop, Transceiver 1 is configured to use two DFB laser sources with light wavelength at $\lambda 1$ and $\lambda 2$ being respectively modulated on two MZMs to form two optical signals before being combined into one output for transmitting through optical fiber. In an embodiment, the DFB laser wavelengths $\lambda 1$ and $\lambda 2$ are selected to be two neighboring channels of ITU grid with a channel spacing of 100 GHz, or 50 GHz, or 25 GHz, or others. The Transceiver 1 can be the two-channel transceiver 100 described in FIG. 1A. Alternatively, the Transceiver 1 can be the two-channel transceiver 100B with the waveguide-based DLI as a 2×1 combiner in FIG. 1B. Further, Transceiver 2 disposed at the receiving end includes the waveguide-based DLI as a 1×2 splitter (a deinterleaver) at least at the receiving portion.

In an embodiment, the tone (or dither) signal f1 or f2 is used to control the heater on the receiver DLI 120 in Transceiver 1. A small portion (typically 2~10%) of CH2 (or CH1) signal λ2 (or λ1) with tone f2 (or f1) is tapped via a first power tap device 117 disposed after the MZM and fed via a second power tap device 127 into the receiver DLI 120 from CH1 PD paths (or CH2 PD path). After this tapped λ2 (or λ1) component passes through the DLI 120 and is detected by a photodiode (PDr) disposed next to the common input of the DLI 120, this λ2 (or λ1) component as a wavelength reference is converted to an electrical signal. The Transceiver 1 further includes a feedback circuit 170 to feed this electrical signal back to the heater of the same DLI 120 of the Transceiver 1 for tuning corresponding interference spectrums of the light wave (from return trip of the communication loop) with both wavelengths λ1 and λ2 so that the heater on the DLI 120 is tuned. In an embodiment, the heater power of the DLI 120 is tuned to have the λ2 (or λ1) power at PDr is maximized. Here the light waves belong to signals of the return trip of the communication loop. In another embodiment, the heater on the DLI 120 is tuned so that a second harmonic of the tone frequency 2f2 (or 2f1) is maximized. As the result, the DLI 120 is set to make the light wave with locked λ1 goes to CH1 PD and the light wave with locked λ2 goes to CH2 PD as desired.

In an alternative embodiment, the above wavelength control scheme using power tap from input DFB light component as wavelength reference can be also implemented to tune DLI in the Transceiver 2 in substantially similar fashion. As the result, the light wave in forward trip of the communication loop is also able to be well controlled to make the light wave with locked λ1 goes to CH1 PD and the light wave with locked λ2 goes to CH2 PD as desired.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A silicon photonic transceiver system comprising:
   a first optical input port for receiving a first optical signal;
   a second optical input port for receiving a second optical signal;
   a first modulator coupled to the first optical input port and being configured to modulate the first optical signal at a first wavelength;
   a second modulator coupled the second optical input port and being configured to modulate the second optical signal at a second wavelength;
   a combiner being configured to generate a transmission signal using the modulated first optical signal and the modulated second optical signal;
   a third optical input port for receiving a third optical signal; and
   a first delay-line-interferometer (DLI) being configured to split the third optical signal into a fourth optical signal and a fifth optical signal, the fourth optical signal being characterized by the first wavelength, the fifth optical signal being characterized by the second wavelength.

2. The system of claim 1 wherein the first modulator comprises a Mach-Zehnder modulator.

3. The system of claim 1 wherein the combiner comprises a 2×1 multimode-interference power combiner or a 2×1 3 dB power combiner.

4. The system of claim 1 wherein the combiner comprises a second DLI.

5. The system of claim 1 wherein the transmission signal comprises a dither signal.

6. The system of claim 1 wherein the first DLI comprises a resistive heater for providing wavelength control.

7. The system of claim 1 wherein the first DLI is waveguide based.

8. The system of claim 1 further comprising a photodetector for processing the fourth optical signal.

9. The system of claim 1 wherein the first DLI comprises a silicon-based waveguide device having two optical paths with one path being made longer than another optical path by a predetermined length and being formed on a silicon-on-insulator substrate and comprises a resistive heater being built around the one optical path having the longer length, the longer length corresponding a delayed phase leading to a free-spectral range of an interference spectrum of the third/fourth optical signal, the free-spectral range being equal to twice of channel spacing between the first wavelength and the second wavelength.

10. The system of claim 1 wherein the first optical signal comprises a passband characterized by a substantially symmetric curve relative to the first and second wavelength.

11. The system of claim 1 wherein the first modulator is configured to add a dither signal to the modulated first optical signal.

12. The system of claim 1 wherein the first DLI comprises a feedback circuit and a resistive heater to tune an interference spectrum of the fourth optical signal and the fifth optical signal.

13. The system of claim 1 further comprising a reference photodiode coupled to the first DLI.

14. A method for locking channel wavelengths, the method comprising:
   receiving a first input signal and a second input signal;
   generating a first optical signal by modulating the first input signal and inserting a first dither signal, the first optical signal is characterized by a first wavelength;
   generating a second optical signal by modulating the second input signal and inserting a second dither signal, the second optical signal is characterized by a second wavelength;
   obtaining a transmission signal by combining the first optical signal and the second optical signal;
   transmitting the transmission signal through an optical link;
   receiving the transmission signal;
   splitting the transmission signal into a third optical signal and a fourth optical signal using a delay-line interferometer (DLI), the DLI being characterized by a free-spectral range equal to twice of channel spacing between the first wavelength and the second wavelength;
   converting the third optical signal to a first electrical signal; and
   converting the fourth optical signal to a second electrical signal.

15. The method of claim 14 wherein the transmission signal comprises a fifth optical signal.

16. The method of claim 14 further comprising converting the first input signal into the first optical signal using a DFB laser.

17. The method of claim 14 further comprising tuning a heater of the DLI to maximize the first electrical signal and the second electrical signal.

18. The method of claim 14 wherein the third optical signal and the fourth optical signal are substantially free from element of the first wavelength and the second wavelength.

19. An optical transceiver system comprising:
- a first modulator configured to modulate a first optical signal at a first wavelength;
- a second modulator being configured to modulate a second optical signal at a second wavelength;
- a combiner being configured to generate a transmission signal using the modulated first optical signal and the modulated second optical signal;
- a third optical input port for receiving a third input signal; and
- a delay-line-interferometer (DLI) being configured to split the third input signal into a fourth optical signal and the fifth optical signal, the fourth optical signal being characterized by the first wavelength, the fifth optical signal being characterized by the second wavelength
- a first photodiode for converting the fourth optical signal into a first electrical signal; and
- a second photodiode for converting the fifth optical signal into a second electrical signal.

20. The method of claim 19 further comprising a reference photodiode coupled to the DLI.

* * * * *